J. NOWAK.
NUT LOCK.
APPLICATION FILED SEPT. 26, 1910.
992,137.
Patented May 9, 1911.
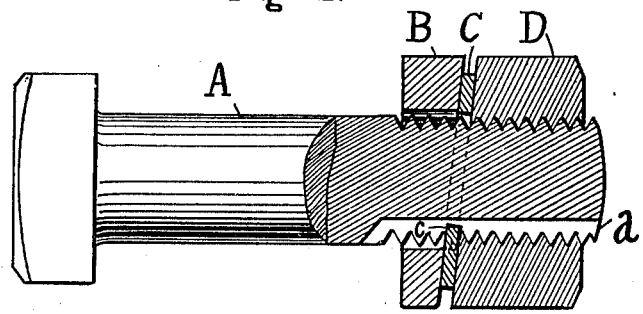
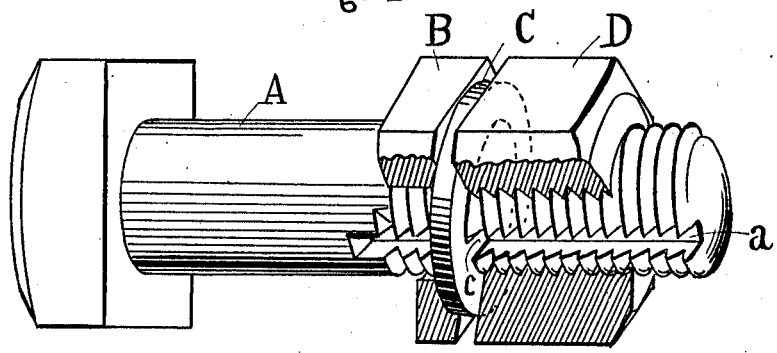
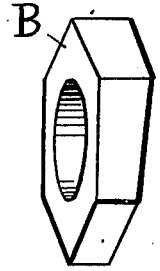  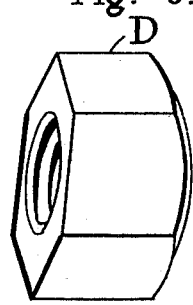
Witnesses:
Samuel W. Balch
James Baw
Inventor,
John Nowak,
by Thomas Ewing Jr.,
Attorney.

UNITED STATES PATENT OFFICE.

JOHN NOWAK, OF YONKERS, NEW YORK, ASSIGNOR OF ONE-THIRD TO ALFONS BLASEWITZ, OF YONKERS, NEW YORK.

NUT-LOCK.

992,137.  Specification of Letters Patent.  Patented May 9, 1911.

Application filed September 26, 1910. Serial No. 583,720.

*To all whom it may concern:*

Be it known that I, JOHN NOWAK, a citizen of the United States of America, and a resident of Yonkers, county of Westchester, and State of New York, have invented certain new and useful Improvements in Nut-Locks, of which the following is a specification.

The object of this invention is to provide a simple nut-lock which will hold the nut on its bolt securely against coming off or loosening through strain or vibration, and yet which will permit the turning of the nut on or off freely with a wrench.

In the accompanying sheet of drawings which forms a part of this application—Figure 1 is an elevation of a bolt with the end bearing a nut-lock embodying my invention in sections. Fig. 2 is a perspective of the same, a portion of the nut-lock being broken away. Fig. 3 is a perspective of the collar. Fig. 4 is a perspective of the washer. Fig. 5 is a perspective of the nut.

The bolt A is provided with a longitudinal groove $a$. An unthreaded collar B is slipped over the bolt and seats against whatever the bolt is to pass through and clamp. The faces of this collar are not parallel so that when one face is in contact with the parts to be clamped the opposite face will be inclined with respect to a plane perpendicular to the axis of the bolt. The collar has hexagonal sides adapting it to be engaged by a wrench. Above this and lying against the inclined face is a washer C provided with a tongue $c$ which loosely surrounds the bolt so that it will seat freely against the inclined face of the collar. The tongue enters the longitudinal groove in the bolt and keeps the washer from turning on the bolt. The outside edge of the washer lies within the sides of the collar which may be engaged by a wrench. A threaded nut D lies above the washer and has its under face inclined to correspond with the inclined face of the collar. In machinery, where parts clamped by a bolt are subject to violent jarring, and particularly where the parts against which the head of the bolt and the nut bear are slightly rotated with respect to each other by the jarring there is a tendency, as is well known, to cause the nut to work loose. By my construction the nut is separated from the part which it clamps by both the tongued washer and the unthreaded collar. Rotation on the bolt of the part against which the collar bears, because of the tongued washer cannot turn the nut loose and because of the collar such action displaces the collar without displacing the nut so that the upper inclined face of the collar is shifted from a position parallel with the under inclined face of the nut, thereby operating to increase the clamping effect. The hexagonal sides of this nut correspond with the hexagonal sides of the collar so that both may be grasped at the same time by wrench jaws and when so grasped the inclined faces of the collar and nut will be kept parallel thus permitting the nut to be turned on or off freely.

What I claim as new, and desire to secure by Letters Patent of the United States, is—

1. The combination with a longitudinally grooved bolt of a free collar and a nut each having an inclined face, and a washer provided with a tongue in engagement with the groove in the bolt separating the collar and nut and adjoining their inclined faces, substantially as described.

2. The combination with a longitudinally grooved bolt of a free collar and a nut with corresponding wrench-engaging sides and each having an inclined face, and a washer provided with a tongue in engagement with the groove in the bolt separating the collar and nut and adjoining their inclined faces, substantially as described.

3. The combination with a longitudinally grooved bolt of an unthreaded collar and a nut with corresponding wrench-engaging sides and each having an inclined face, and a washer provided with a tongue in engagement with the groove in the bolt separating the collar and nut and adjoining their inclined faces, substantially as described.

Signed by me at Yonkers, N. Y., this 22d day of September, 1910.

JOHN NOWAK.

Witnesses:
 ALFONS BLASEWITZ,
 IGNATZ KATZ.

Copies of this patent may be obtained for five cents each, by addressing the "Commissioner of Patents, Washington, D. C."